July 29, 1952     V. H. FRAENCKEL     2,604,831
MAGNETIC FILM HOLDER FOR CAMERAS
Filed Aug. 16, 1950
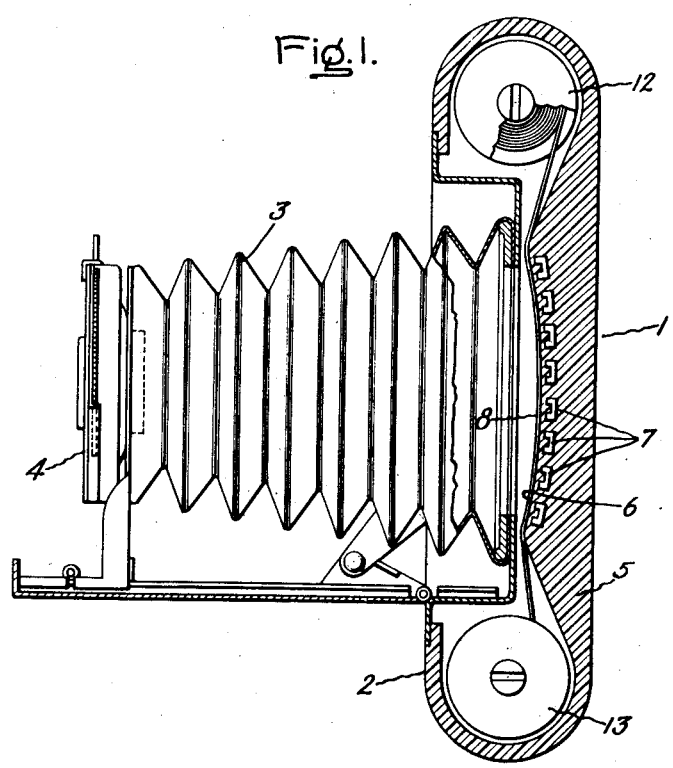
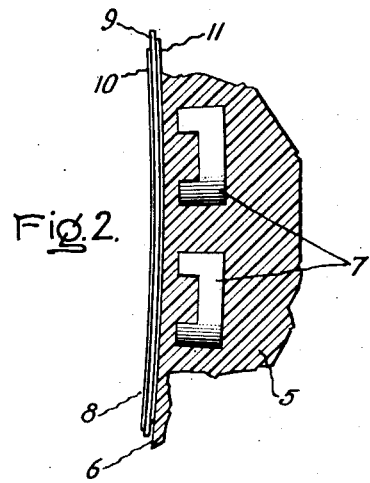
Inventor:
Victor H. Fraenckel,
by Paul A. Frank
His Attorney.

Patented July 29, 1952

2,604,831

UNITED STATES PATENT OFFICE 2,604,831

MAGNETIC FILM HOLDER FOR CAMERAS

Victor H. Fraenckel, Scotia, N. Y., assignor to General Electric Company, a corporation of New York Application August 16, 1950, Serial No. 179,715

3 Claims. (Cl. 95—11)

My invention relates to magnetic film holders and more particularly to magnetic film holders for use in photographic optical systems.

In photographic optical systems, it is often necessary to position the photographic film in a curved image plane. Heretofore it has been difficult to cause conventional photographic film to conform to the shape of a concave image plane. Vacuum holding techniques have been employed with a certain measure of success, but their inherent complexity prohibits the use of such systems in small cameras. In photographic optical systems having a straight image plane, there is some difficulty encountered in causing conventional photographic film to conform exactly to the flat image plane since the conventional pressure plate system does not always hold the portion of the film to be exposed exactly in the image plane.

Therefore, an important object of my invention is to provide an improved film-holding system which can be employed in both large and small cameras.

Another object of my invention is to provide an improved film-holding system for holding photographic film in a curved image plane in photographic optical systems.

Yet another object of my invention is to provide an improved system for holding photographic film in the straight image plane of conventional cameras.

In carrying out my invention in the preferred form thereof, I provide a photographic film having a layer of magnetic material deposited on the back of the film base thereof. A photographic camera is provided with holding magnets arranged adjacent the image surface. The magnets hold the film in the desired image plane by magnetic attraction.

For additional objects and advantages and for a better understanding of my invention, attention is now directed to the following description and the accompanying drawing and also the appended claims in which the features of my invention believed to be novel are particularly pointed out. Fig. 1 is a top plan view in partial section of a photographic optical system embodying my invention; and Fig. 2 is an enlarged view of a portion of Fig. 1.

My invention will be hereinafter described as embodied in a photographic optical system having a concave image plane. It will be understood, however, that the principles involved are applicable to any photographic optical system employing an image plane having a shape which can be assumed by a flexible photographic film.

Referring to the drawing, the camera 1 is provided with a box portion 2, a bellows 3, and a shutter and focusing mechanism 4. The details of shutter and focusing mechanism are well known in the art and are not shown in the drawing since these are not a part of my invention. The inside of box 2 and bellows 3 is sealed against the entrance of all light except that admitted through shutter and focusing mechanism 4. The side wall 5 of box 2 is provided with the surface 6. Surface 6 has substantially the same radius of curvature as the image plane employed in the photographic optical system and is adjacent the image plane. Magnetic devices such as the small Alnico magnets 7 are embedded in side 5 adjacent surface 6 and are juxtaposed to the image plane of the optical system of the camera. The magnetic fields of magnets 7 pass through surface 6.

The film 8 is made up of a film base 9 having a light-sensitive emulsion 10 on one side, and having some magnetic material, such as a layer of ferroso-ferric oxide 11, on the other side. A layer of ferroso-ferric oxide 1/1000 inch thick was found to work satisfactorily. The unexposed portion of film 8 is wound on the take-up reel 12. The free end of film 8 is passed over surface 6 and attached to the reel 13. Light-sensitive surface 10 faces shutter and focusing mechanism 4. Film 8 is compelled to conform to the curvature of surface 6 by the magnetic attraction between magnets 7 and ferric oxide layer 11.

Light admitted to bellows 3 by shutter and focusing mechanism 4 passes through bellows 3 and box portion 2 and strikes light-sensitive surface 10. After a section, hereinafter called a frame, of film 8 has been exposed, it is wound onto reel 13 by a manual film transporting mechanism. Film transporting mechanisms are well known in the art and will not be described herein.

When one frame on film 8 is exposed and an unexposed frame is transported to a position in front of surface 6, the new frame is in a substantially flat plane. However, in photographic optical systems having a curved image plane, the radius of curvature of the image plane is so large that the slack provided by backlash in the film transporting mechanism and by the elasticity of the film is sufficient to permit the film to be drawn into the image plane by magnets 7.

While the present invention has been described by reference to particular embodiments thereof, it will be understood that this is by way of illustration of the principles involved and that those skilled in the art may make many modifications in the arrangement and mode of operation. Therefore, I contemplate by the appended claims to cover any such modifications as fall within the true spirit and scope of this invention.

What I claim as new and desire to secure by Letters Patent of the United States is:

1. In a photographic camera, a photographic film having a flexible film base and a light-sensitive emulsion on one side of said film base, a layer of magnetic material on the other side of said film base, said camera having a closed compartment and having an optical system mounted in one wall of said compartment, said compartment being sealed against the entrance of all light except that admitted through said optical system, said compartment having a second wall thereof facing said optical system, magnetic devices embedded in said second wall and being spaced apart in juxtaposition of the image plane of said optical system for holding said photographic film in position to be exposed.

2. In a photographic camera having a compartment comprising a wall having an optical system mounted therein having a curved image plane and a second wall provided with a surface facing said first wall and curved to conform to said image plane, a photographic film having a flexible film base, a light-sensitive emulsion on one side of said film base, a layer of magnetic material on the opposite side of said film base, supporting means in said camera for supporting said film in proximity to said image plane, and a plurality of magnetic devices embedded in said second wall and juxtaposed to said image plane to attract and maintain said film in position firmly against said curved surface.

3. In a photographic camera having a compartment comprising a wall having an optical system mounted therein having a flat image plane and a second wall provided with a flat surface facing said first wall, a photographic film having a flexible film base, a light-sensitive emulsion on one side of said film base, a layer of magnetic material on the opposite side of said film base, supporting means in said camera for supporting said film in proximity to said image plane, and magnetic devices embedded in said second wall and juxtaposed to said image plane to attract and maintain said film in position firmly against said flat surface.

VICTOR H. FRAENCKEL.

REFERENCES CITED

The following references are of record in the file of this patent:

UNITED STATES PATENTS

| Number | Name | Date |
|---|---|---|
| 1,082,678 | Casler | Dec. 30, 1913 |
| 1,244,919 | Thomas | Oct. 30, 1917 |
| 2,259,238 | Bernhard | Oct. 14, 1941 |
| 2,346,582 | Insler et al. | Apr. 11, 1944 |
| 2,395,590 | Simmon et al. | Feb. 26, 1946 |

FOREIGN PATENTS

| Number | Country | Date |
|---|---|---|
| 222,940 | Great Britain | Oct. 9, 1924 |